United States Patent [19]
Takacs

[11] Patent Number: 5,568,882
[45] Date of Patent: Oct. 29, 1996

[54] PRECISE VOLUME FLUID DISPENSER

[75] Inventor: Gregory W. Takacs, Hudson, Ohio

[73] Assignee: ABC Techcorp, Akron, Ohio

[21] Appl. No.: 383,445

[22] Filed: Feb. 3, 1995

[51] Int. Cl.$^6$ .................................................. B67D 5/08
[52] U.S. Cl. ........................... 222/61; 222/64; 222/155; 222/397; 222/399
[58] Field of Search .................. 222/61, 64, 66, 222/155, 397, 399

[56] References Cited

U.S. PATENT DOCUMENTS

| | | | |
|---|---|---|---|
| 2,520,175 | 8/1950 | Socke | 222/155 X |
| 3,956,934 | 5/1976 | White | 222/155 X |
| 4,029,473 | 6/1977 | Sharples | 222/399 X |
| 4,106,671 | 8/1978 | Sharples | 222/64 X |
| 4,259,975 | 4/1981 | Kinsey, Jr. et al. | 222/155 X |
| 4,560,091 | 12/1985 | Souren | 222/155 |
| 4,676,404 | 6/1987 | Yamazaki et al. | 222/61 X |
| 5,042,689 | 8/1991 | Mrugala et al. | 222/66 |
| 5,370,269 | 12/1994 | Bernosky et al. | 222/61 |

FOREIGN PATENT DOCUMENTS

| | | | |
|---|---|---|---|
| 0281927 | 11/1988 | Japan | 222/64 |

*Primary Examiner*—Joseph Kaufman
*Attorney, Agent, or Firm*—Renner, Kenner, Greive, Bobak, Taylor & Weber

[57] ABSTRACT

A fluid dispenser for measuring precise volumes of a fluid for later mixing with other materials which has a pressure vessel for receiving a fluid supplied from a supply tank, a bubbler sensor communicating with the pressure vessel for correlating pressure within a bubbler tube with volume in the pressure vessel so that a controller in communication with the bubbler sensor can control the inflow and outflow of precise volumes of the fluid through the pressure vessel. The bubbler robe is received within the pressure vessel and is monitored by a pressure transducer which communicates with the controller so that a plurality of solenoid valves can control the inflow and outflow of the measured fluid.

14 Claims, 5 Drawing Sheets

PRECISE VOLUME FLUID DISPENSER

TECHNICAL FIELD

The invention herein resides generally in the art of devices for collecting and dispensing a precise quantity or volume of fluid which is then dispensed for mixture with other materials. More particularly, the present invention relates to a device for collecting and dispensing a precise volume of fluid wherein a pressure level sensor is employed to determine the volume of fluid in a pressure vessel. Specifically, the present invention relates to a device for collecting and dispensing a precise volume of fluid wherein a bubbler tube is employed to provide pressure data, which corresponds to fluid volume, to a controller that sequentially controls the inflow and outflow of the fluid through a pressure vessel.

BACKGROUND ART

It is well known that in the beverage, pharmaceutical, concrete mixing, and various other industries that precise volumetric quantities of fluid are required. For example, in the beverage industry it is important to mix exact quantities of syrup with carbonated water in order for the beverage to acquire the proper taste. The pharmaceutical industry :requires exact volumes of fluid for prescription drugs, intravenous solutions and other over-the-counter preparations. The need for precise volumes of fluid is also required in the concrete mixing industry. It is well known that along with water, liquid-based strength additives are added to cement and a mineral aggregate to form superior types of concrete.

Currently, predetermined volumes of fluid are provided by devices that operate upon physical characteristics such as pressure or weight. One such device employs Boyle's Law, which states that if a gas or liquid is kept at a constant temperature, the pressure and volume are in inverse proportion or have a constant product. Although this law is useful, it is only approximately true. Boyle's Law is graphically represented by an equilateral hyperbola. Therefore, the volume of liquid contained within a collector or pressure vessel may be logarithmically derived from the pressure therein. As will be appreciated by those skilled in the art, using Boyle's Law to determine a precise volume of fluid has several drawbacks. First, the level of accuracy in measuring the volume is diminished because a logarithmic function is required to measure the volume. Secondly, the pressure transducer must undergo frequent maintenance checks because of its close proximity to the fluid being measured.

Another method for determining a volume of fluid is by employing a weighing system. This method: requires that a tare weight be read before filling a container with fluid. After filling the container with fluid, the weight of the filled container is read and the volume of fluid contained therein is determined. This method of determining the amount of fluid in a container also has several drawbacks. First, the additional use of a weighing scale is required, along with compensation for the tare weight. Furthermore, the accuracy of any reading is diminished because of external forces applied to the container, such as hoses and supports, during the weighing process. It is also known to employ a positive displacement pump to measure the volume of fluid.

Based upon the foregoing, there is a need in the art for a simple yet accurate device for collecting and dispensing a precise volume of fluid. Additionally, there is a need for a fluid collecting and dispensing device that can be used in either wet line or dry line applications. There is also a need for a precise volume fluid collecting and dispensing device that can be retrofitted to existing fluid dispensing systems.

DISCLOSURE OF THE INVENTION

In light of the foregoing, it is a first aspect of the present invention to provide a precise volume fluid dispenser.

Another aspect of the present invention is to provide a precise volume fluid dispenser wherein a bubbler tube is employed to provide pressure data to a controller which sequentially controls the inflow and outflow of fluid through a pressure vessel.

Still a further aspect of the present invention is to provide a precise volume fluid dispenser, as set forth above, wherein a pressure transducer only measures air pressure which correlates to fluid pressure, thus reducing the amount of maintenance required for the pressure transducer.

Yet a further aspect of the present invention is to provide a precise volume fluid dispenser, as set forth above, which greatly increases the accuracy over other methods of measuring fluid volume because the fluid level is measured linearly rather than logarithmically as required by Boyle's Law.

Another aspect of the present invention is to provide a precise quantity fluid dispenser, as set forth above, wherein the measuring process is not exposed to undesirable external forces as in a weighing method.

Still a further aspect of the present invention is to provide a precise volume fluid dispenser, as set forth above, wherein the dispenser can be incorporated into existing fluid dispensers.

A further aspect of the present invention is to provide a precise volume fluid dispenser, as set forth above, wherein the dispenser is equally adaptable to dry line and wet line configurations.

Another aspect of the present invention is to provide a precise volume fluid dispenser, as set forth above, wherein a bubbler tube is employed to measure fluid level by the amount of pressure required to force air out of the bubbler tube.

Another aspect of the present invention is to provide a precise volume fluid dispenser, as set forth above, wherein the bubbler tube is incorporated within a dispense pressure tube.

Still a further aspect of the present invention is to provide a precise volume fluid dispenser, as set forth above, wherein the bubbler tube is contained within a sight tube to allow visual verification of the operation of the dispenser.

Yet a further aspect of the present invention is to provide a precise volume fluid dispenser, as set forth above, wherein a pressure vessel is stepped or tapered to increase the sensitivity of the dispenser.

The foregoing and other aspect of the invention which shall become apparent as the detailed description proceeds are achieved by a fluid dispenser for measuring precise volumes of a fluid for later mixing, comprising: a pressure vessel for receiving a fluid supplied from a supply tank; a bubbler sensor monitoring the pressure vessel for determining when a predetermined pressure level has been attained within the pressure vessel; and a controller in communication with the bubbler sensor for controlling the inflow and outflow of the fluid through the pressure vessel.

The present invention also provides a fluid dispenser for measuring precise volumes of a fluid for later mixing with other materials, comprising: a pressure vessel; a supply tank for supplying a fluid to the pressure vessel; a bubbler sensor in communication with the pressure vessel; a dispense pressure supply in communication with the pressure vessel; a dispense tank for receiving the fluid from the pressure vessel; and a controller in communication with the bubbler sensor so as to determine when a precise volume of the fluid is to be received and dispensed by the pressure vessel.

BEST MODE FOR CARRYING OUT THE INVENTION

Figure 1:
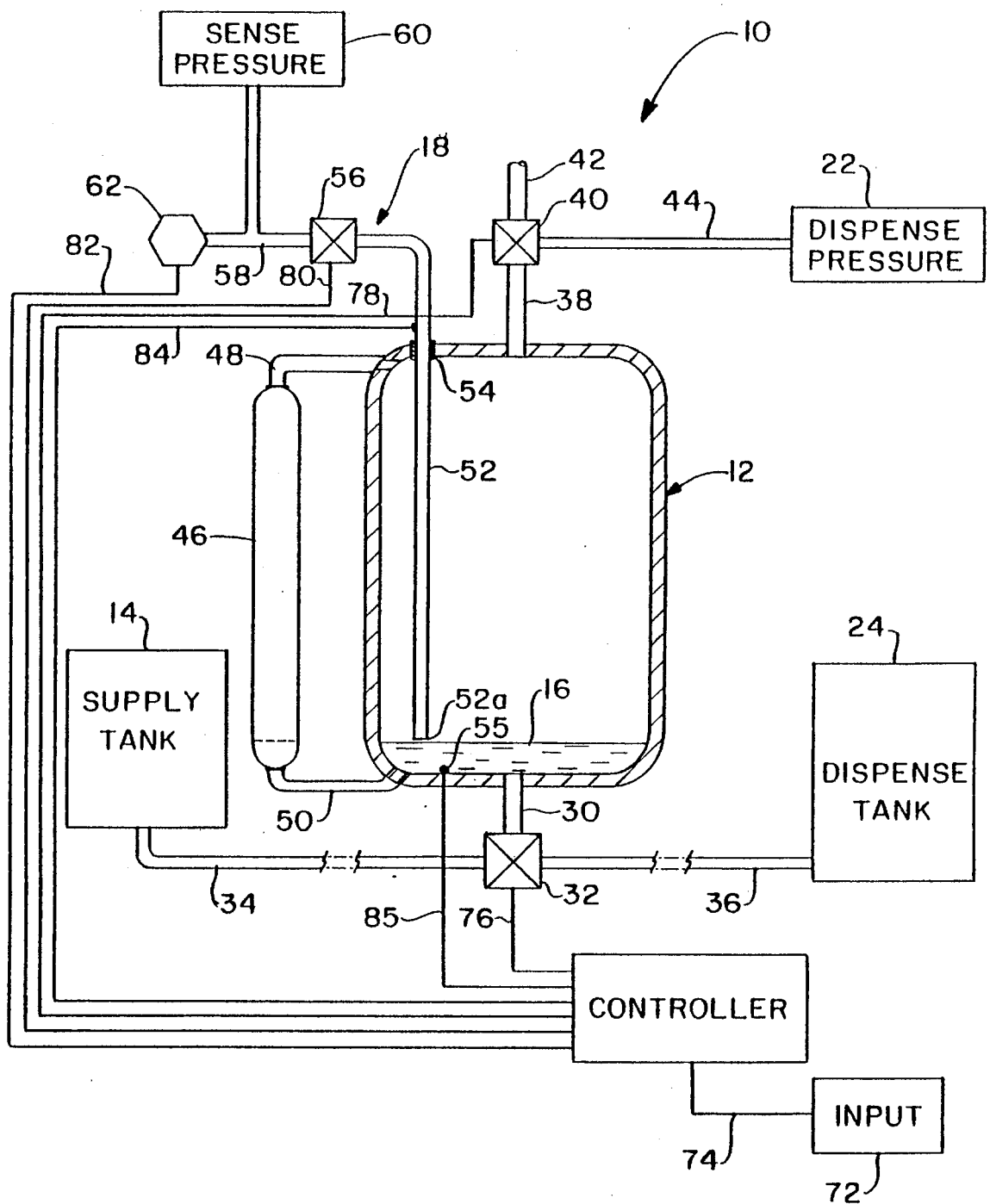
FIG. 1 is a schematic diagram illustrating a fluid dispenser for measuring precise volumes of a fluid.

Referring now to the drawings and more particularly to FIG. 1, it can be seen that a precise volume fluid dispenser according to the present invention is designated generally by the numeral 10. Generally, the precise volume fluid dispenser 10 includes a pressure vessel 12, a supply tank 14 for supplying a fluid 16, a bubbler sensor 18, a dispense pressure supply 22, a dispense tank 24 for receiving the fluid 16 from the pressure vessel 12, and a controller 26 which precisely measures a volume of fluid to be received and dispensed by the pressure vessel 12. As will be described in detail below, the pressure vessel 12 receives a supply of fluid 16 from the supply tank 14 while the bubbler sensor 18 continuously monitors the air pressure, or a pressure head within the pressure vessel 12. The bubbler sensor 18 communicates with the controller 26 for the purpose of determining when a predetermined pressure level has been attained so that the controller 26 can then stop the flow of fluid 16 from the supply tank 14 to the pressure vessel 12. After the desired amount of fluid 16 is received within the pressure vessel 12, the controller 26 causes the dispense pressure supply 22 to transfer the fluid 16 within the pressure vessel 12 to the dispense tank 24. Those skilled in the art will appreciate that any type of fluid could be used in conjunction with the present invention. Furthermore, although the pressure vessel 12 in the preferred embodiment is rated for two to twenty gallons, the present invention could be practiced with any size pressure vessel.

In particular, the pressure vessel 12 is connected to a fluid pipe 30 which terminates at a solenoid valve 32. A pipe 34 extends from the supply tank 14 to the solenoid valve 32. A third interconnection with the valve 32 is by a pipe 36 which passes to the dispense tank 24. Those skilled in the art will appreciate that the solenoid valve 32 has at least three distinct positions. The first position permits the fluid 16 to flow from the supply tank 14 through the pipe 34, through the pipe 30 into the pressure vessel 12. The second position prevents the fluid 16 from either flowing into or out of the pressure vessel 12. The final position permits fluid 16 to flow out of the pressure vessel 12 through the pipe 30 and the pipe 36 to the dispense tank 24. Those skilled in the art will appreciate that although the valve 32 is of the solenoid type, any suitable type of three position valve may be employed.

Extending from the pressure vessel 12 is a dispense pressure tube 38 which, at its opposite end, is connected to a solenoid valve 40. Also connected to the solenoid valve 40 is a vent 42 and a pipe 44 which, at its opposite end, is connected to the dispense pressure supply 22. Similar to the solenoid valve 32, the solenoid valve 40 is a three position valve. The first position allows air or other gases contained within the pressure vessel 12 to proceed through the dispense pressure tube 38 and the vent 42. A second position seals the pressure vessel 12. The final position allows the dispense pressure supply 22 to force pressurized air or gas through the pipe 44 and the dispense pressure tube 38 into the pressure vessel 12. Those skilled in the art will appreciate that although the valve 40 is of the solenoid type, any suitable type of three position valve may be employed.

A sight tube 46 is operatively connected to the pressure vessel 12 to provide a visual indication of the amount of fluid 16 in the pressure vessel 12. The sight tube 46 and the pressure vessel 12 are interconnected by a conduit 48 at their respective upper portions and by a conduit 50 at their respective lower portions. Those skilled in the art will appreciate that the sight tube 46 is made of an optically clear material so that the volume or amount of fluid contained within the pressure vessel 12 is visually ascertainable.

The bubbler sensor 18, which is in communication with the pressure vessel 12, monitors the amount of pressure attained within the pressure vessel 12. The bubbler sensor 18 includes a bubbler tube 52 received within the pressure vessel 12. An insulator 54 is disposed between the bubbler tube 52 and the pressure vessel 12. As those skilled in the art will appreciate the insulator 54 functions to provide a seal between the bubbler tube 52 and the pressure vessel 12 and also to electrically isolate the bubbler tube 52 from the pressure vessel 12. A pin 55 is disposed at the bottom of the pressure vessel 12 and is connected to the controller 26 by a control line 85. As such, the bubbler tube 52 may also function as an empty sense rod 52a which will be described in more detail below. A solenoid valve 56 is disposed between the bubbler tube 52 and a bubble pipe 58, the latter of which is connected to the sense pressure supply 60. A pressure transducer 62 is provided in appropriate communication with the sense pressure supply 60 for sensing the pressure within the bubbler tube 52. It will be appreciated that the solenoid valve 56 is a two position valve which is either open or closed such that in the open position the sense pressure supply 60 provides a sensing pressure through the bubbler tube 52. Although the valve 56 is of the solenoid type, any suitable type of two position valve may be employed.

The controller 26 receives operator instructions from an input interface 72 through an input line 74. The controller operatively controls the solenoid valves 32, 40 and 56 by control lines 76, 78 and 80, respectively, for selective activation. Additionally, an empty sense line 84 is interconnected between the bubbler tube 52 and the controller 26.

In operation, an operator inputs to the controller 26, through the input interface 72, the desired amount of fluid required for mixing with other materials. The controller 26 then appropriately regulates the solenoid valves 32, 40, 56 to achieve the desired dispensing. The controller 26 opens the valve 32 to allow liquid to pass from the supply tank 14 to the pressure vessel 12. Of course, at this time the valve 40 is actuated to vent the vessel 12 to atmosphere through the tube 38 and vent 42.

As a part of the measurement process, the controller 26 opens the solenoid valve 56, causing the sense pressure source 60 to communicate with atmosphere through the bubbler tube 52 and any contents of the vessel 12. With the valve 56 open, the pressure transducer 62 effectively monitors the pressure in the bubbler tube 52. In the preferred embodiment, the sense pressure supply 60 provides a regulated air pressure of approximately 2 psi above atmosphere pressure—or approximately 16.7 psi. The controller 26 continually monitors the pressure transducer 62 through the control line 82. With the level of the liquid within the vessel 12 below the opening at the end 52a of the bubbler tube 52, the pressure within the bubbler tube 52 is Substantially atmospheric. However, as the liquid level within the pressure vessel 12 rises, the pressure within the bubbler tube 52 and pipe 58 increases accordingly toward the level of the pressure source 60 with the controller 26 comprising a microprocessor or the like having a "look-up table" or other available source for correlating pressure at the transducer 62 with liquid level in the vessel 12. The controller 26 may readily determine when the monitored pressure is indicative of a desired amount of fluid contained within the pressure vessel 12. At that time, the controller 26 causes the solenoid valve 32 to close so as to stop the flow of fluid 16 from the supply tank 14 to the pressure vessel 12. With the fluid 16 at a quiescent state, the pressure transducer 62 may verify the volume of fluid within the pressure vessel 12. If the desired volume has not been attained, the valve 32 may be opened to allow a further inflow and the process renewed until the target volume has been reached.

To start the dispensing procedure, the controller 26 closes solenoid valve 56 and actuates the solenoid valve 40 to interconnect the dispense pressure supply 22 with the vessel 12 to pressurize it through the pipe 44 and the tube 38. Then the controller 26 opens the solenoid valve 32 so that the fluid 16 may be forced from the pressure vessel 12 through the fluid pipe 30 and the pipe 36 to the dispense tank 24 under the urging of the pressure head generated by the pressure source 22. It will be appreciated that the fluid 16 flows through the fluid pipe 30 and the pipe 36 to the dispense tank 24 for later mixing with other desired materials. Those skilled in the art will appreciate that the dispense pressure source 22 is at an appropriate pressure such as 50 psi.

During dispensing, the fluid 16 itself may serve as the monitoring medium to determine when the full measure of fluid has been dispensed. According to one embodiment of the invention, the fluid serves as an electrical conductor in a circuit including the bubbler robe 52 and a pin 55 maintained at the bottom of the interior of the vessel 12. When the fluid 16 is at such a level as to touch both the tube 52 and the pin 55, the circuit is complete or "closed" as sensed by the controller 26 through the lines 84, 85. However, when the fluid 16 has been dispensed to a level below the end 52a of the tube 52, the circuit is "open," indicating to the controller 26 that the desired amount of fluid 16 has been dispensed into the dispense tank 24. At this time, the controller 26 closes the solenoid valve 32 so that the pressure vessel 12 can no longer receive or supply fluid 16. Simultaneously, the controller 26 actuates the solenoid valve 40, either sealing the vessel 12 or venting it to atmosphere while assuring that the dispense pressure supply 22 no longer exerts any pressure within the pressure vessel 12.

When using the bubbler tube 52 as an "empty sensor," the effective bottom of the cavity of the vessel 12 is the end 52a of the tube 52. Accordingly, a residual of fluid 16 will typically remain within the vessel 12. It is also contemplated, however, that the entirety of the vessel 12 and the pipe 30 may be completely emptied on each dispense cycle, in which case compensation will necessarily be made in each volumetric determination for the volume of fluid 16 maintained in the pipe 30 and vessel 12 beneath the pipe end 52a.

It will be appreciated from the foregoing that during the measuring process, the pressure sensed by the pressure transducer 62 correlates directly to the amount of fluid 16 contained within the pressure vessel 12. Therefore, the structure of dispenser 10 greatly increases the accuracy of measuring fluid 16 contained within a pressure vessel 12 for later use with other materials.

It is apparent from the above description of the operation of the fluid dispenser 10 that the problems associated with previous fluid dispensers have been overcome. In particular, the fluid dispenser 10 measures the amount of fluid contained with a pressure vessel 12 based upon a linear relationship between the pressure within the force required to pass air through the bubbler tube 52 and the level of fluid 16 contained within the vessel 12. This is in distinct contrast to the Boyle's Law method of determining a fluid quantity which requires utilizing a logarithmic calculation of the volume of the fluid. Furthermore, the fluid dispenser 10 is more accurate than known methods of weighing a fluid to determine its volume since there are no connecting hoses or other forces interfering with the measuring process and there is no tare weight to consider. Another advantage of the fluid dispenser 10 is that the pressure transducer 62 is only in contact with air and is not exposed to the fluid 16 contained with the pressure vessel 12. A further advantage of the present fluid dispenser 10 is that the structure of the device can be incorporated into existing fluid dispensers.

It will also be appreciated that selected components of the fluid dispenser 10 could be provided to an end-user as a kit. This would allow end-users to modify their existing fluid dispensers so as to take advantage of the present invention. Typically, a kit would contain the bubbler sensor 18, the controller 26, the insulator 54, the control lines 76–85, the solenoid valves 32, 40 and 56, the sense pressure supply 60, the bubble pipe 58, and the pressure transducer 62. The end-user could retrofit their existing equipment with the above listed components thus saving the cost of replacing an entire dispenser. Of course, any or all of the components described in FIG. 1 could be provided in the kit. Additionally, the present invention could be practiced where the pipes 30, 34, 36, 38, 42 and 58 are flexible hoses.

Although FIG. 1 illustrates the preferred embodiment of the fluid dispenser 10, it will be appreciated that Other alternative embodiments could be employed. The additional embodiments shown in FIGS. 2–5 are substantially similar to the preferred embodiment except where different identifying numbers are employed. Therefore, no specific discussion of the operation of elements identified with prime numbers is provided. Reference should be made to the discussion of FIG. 1 for a complete understanding of how previously identified elements function.

Figure 2:
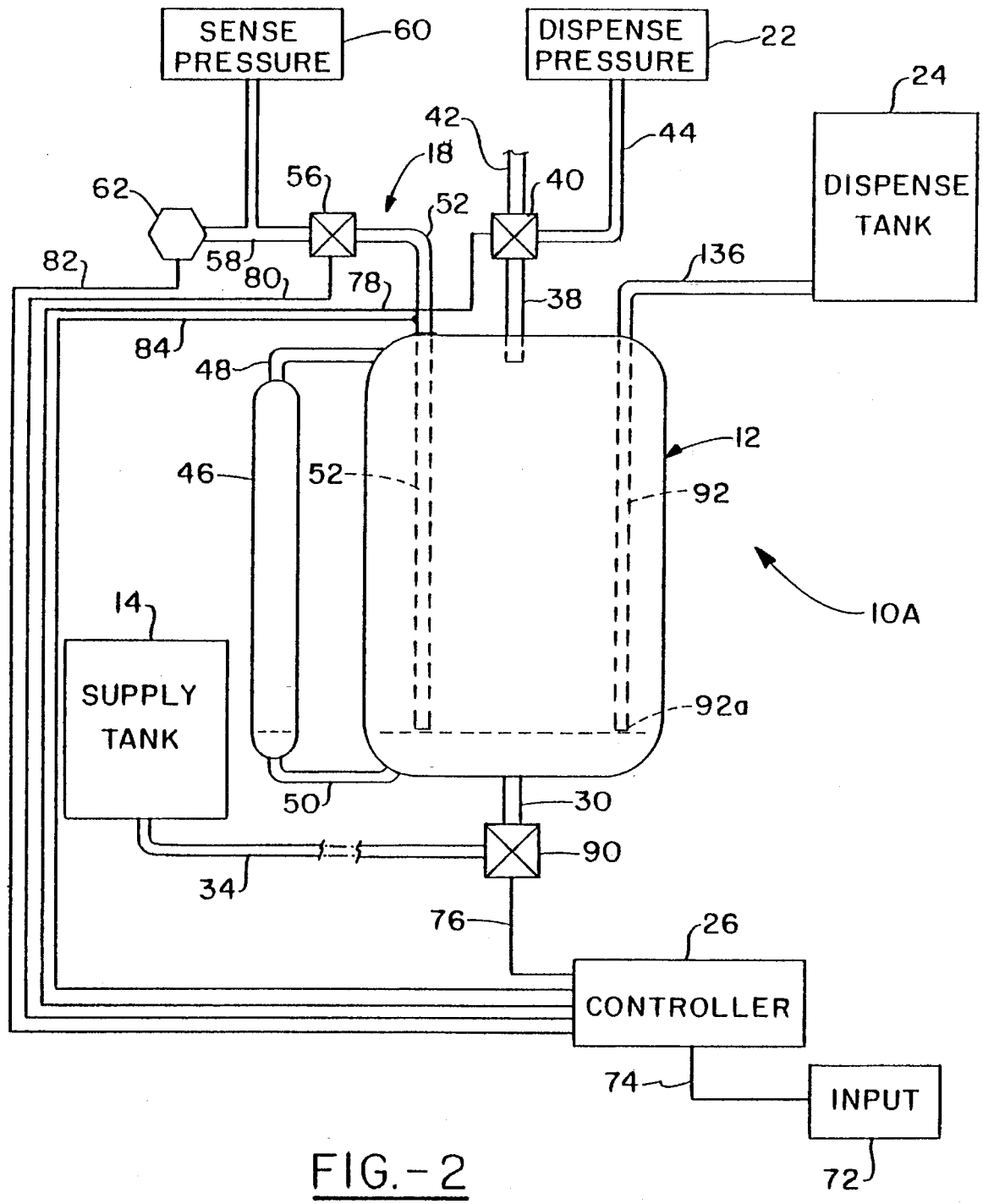
FIG. 2 is a schematic diagram illustrating the operation of a dry line fluid dispenser for measuring precise volumes of a fluid.

In particular, FIG. 2 illustrates the fluid dispenser 10A in a dry line application. A dry line fluid dispenser is employed whenever the user desires that all fluid 16 removed from the dispensing line at the end of a dispensing cycle. In this embodiment, the pressure vessel 12 has a fluid pipe 30 which communicates with a solenoid valve 90. The solenoid valve 90 is communicative with a pipe 34 and is controlled by a control line 76. In this embodiment, the solenoid valve 90 is a two position valve which operates either in an open position or a closed position so as to only control the flow of fluid 16 into the pressure vessel 12. Those skilled in the art will appreciate than when a dispense pressure is received within the pressure vessel 12 all fluid will exit through a down tube 92 into the dispense tank 24. In this embodiment, the bottom 92a of the tube 92 defines the bottom of the measuring reservoir and obviates the need for an empty sensor. Thus, it can be seen that the precise quantity fluid dispenser 10A is also applicable for use in a dry line application.

Figure 3:
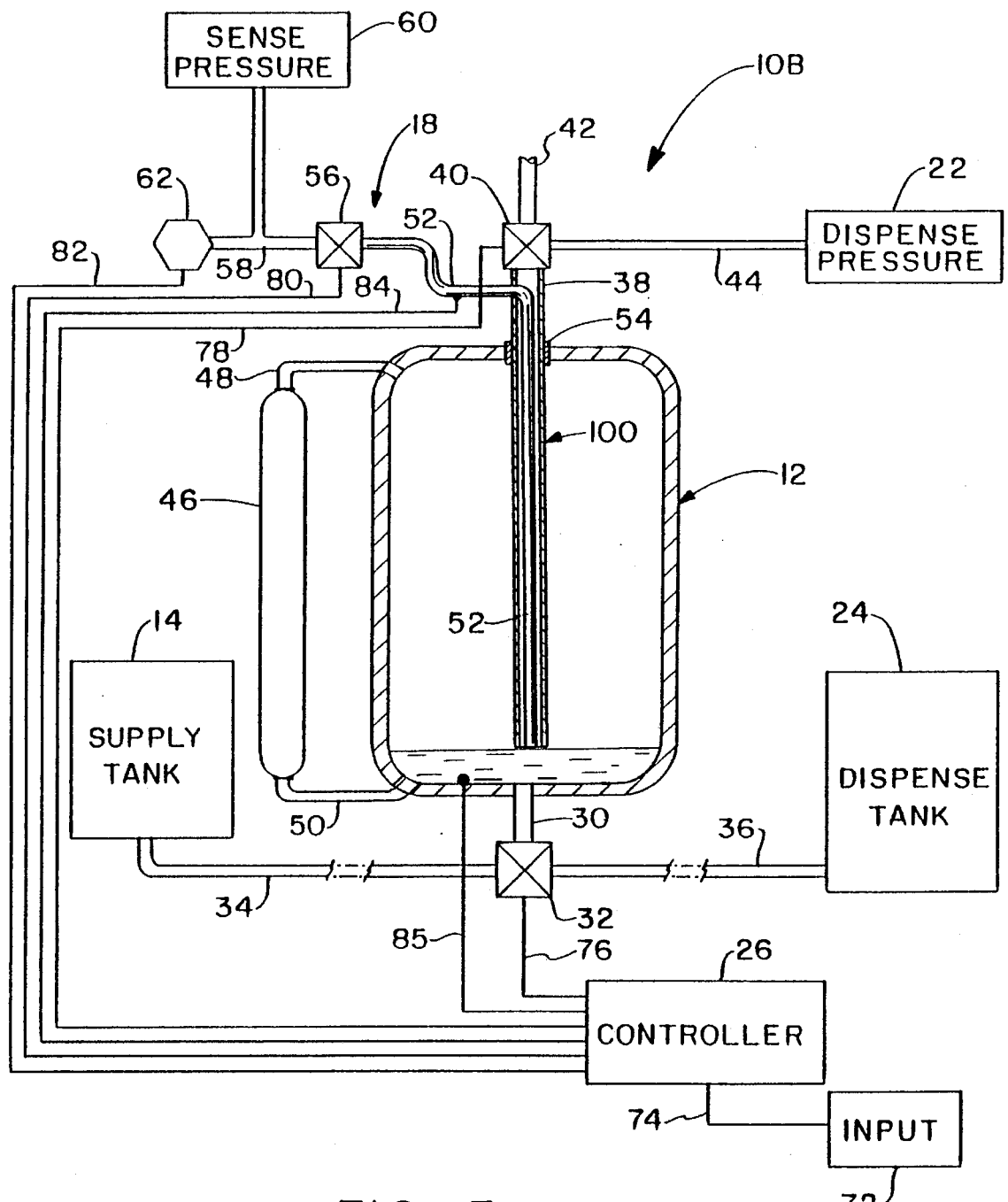
FIG. 3 is a schematic diagram illustrating a fluid dispenser wherein a bubbler tube is incorporated into a dispense pressure supply.

A second alternative embodiment of the fluid dispenser 10B is illustrated in FIG. 3. FIG. 3 illustrates the use of a combination tube 100 wherein the bubbler tube 52 is combined and joined with the dispense pressure tube 38. An insulator 54 is disposed between the combined tube 100 and pressure vessel 12 so that it can function as an empty sense rod. The advantage of this embodiment is that the bubbler tube 52 is cleared of any impediments during the dispensing operation by virtue of the dispensing pressure being exerted therethrough.

Figure 4:
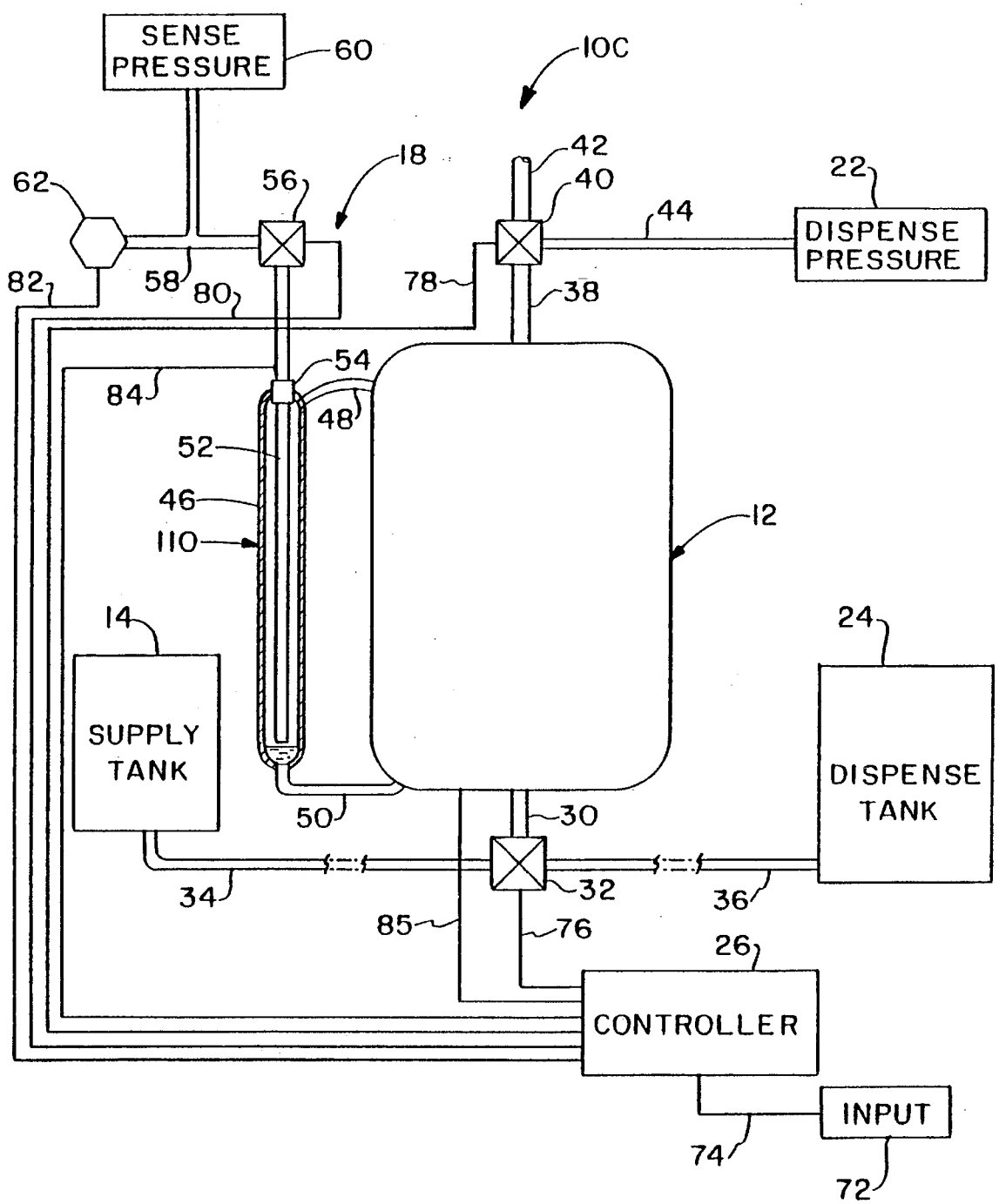
FIG. 4 is a schematic diagram illustrating a fluid dispenser wherein a bubbler tube is incorporated into a sight tube.

Another alternative embodiment is illustrated in FIG. 4, where the fluid dispenser 10C is configured such that a visual pressure tube 110 combines a sight tube 46 with a bubbler tube 52. As before, the sight tube 46 has a top conduit 48 and a bottom conduit 50 which are interconnected with the pressure vessel 12. An insulator 54 is disposed between the sight tube 46 and a bubbler tube 52 which is received within the sight tube 46. As in the preferred embodiment a solenoid valve 56, controlled by the controller 26 is interposed between the bubbler tube 52 and bubble pipe 58. This visual pressure tube 110 has the advantage of allowing the operator to visualize both the fluid level within the pressure vessel 12 and also to visualize the bubbles being forced out of the bubbler tube 52 to ensure the operation thereof. In other aspects, the dispenser 10C is substantially identical to the dispenser 10.

Figure 5:
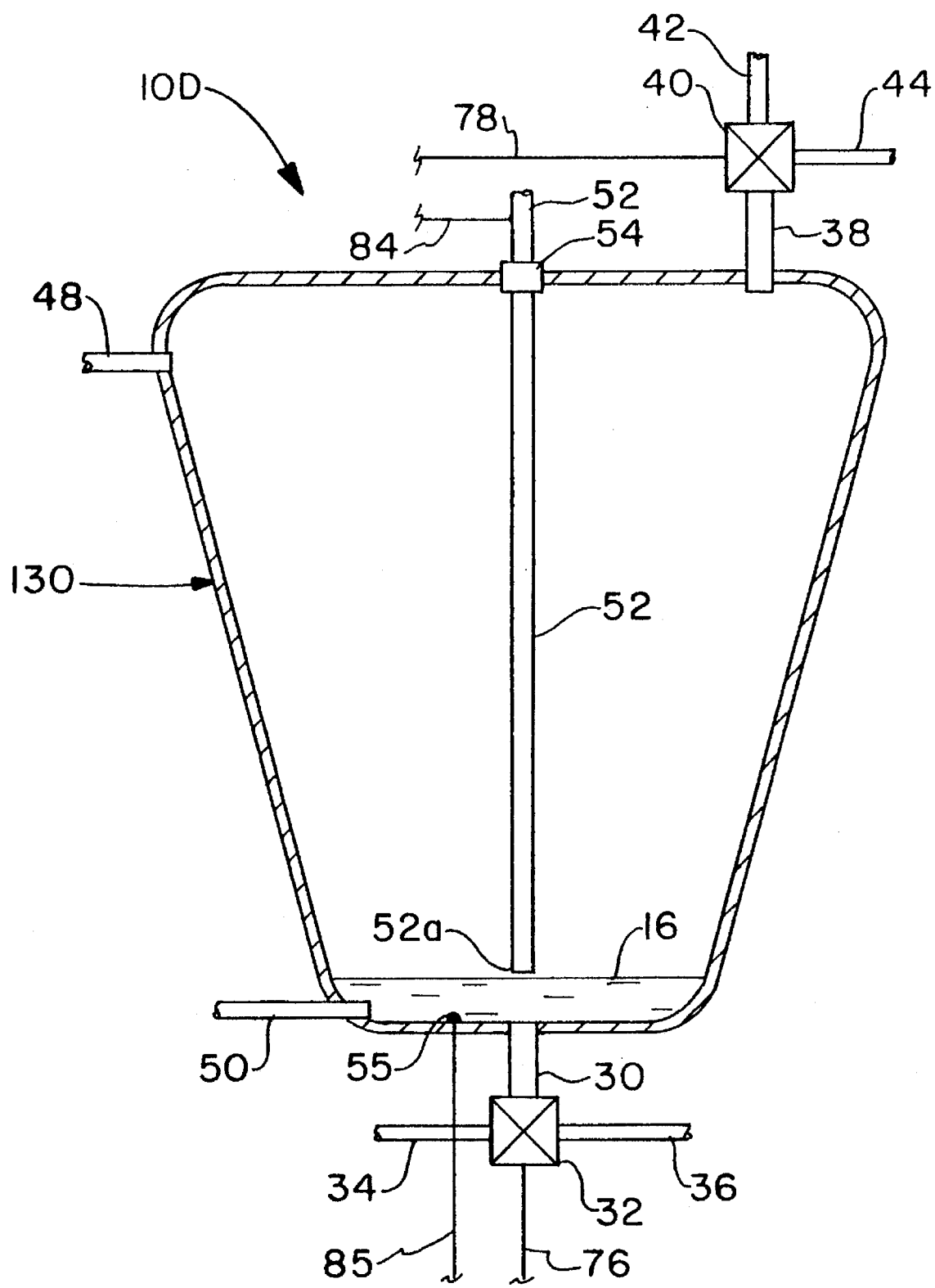
FIG. 5 is a schematic diagram of a tapered pressure vessel employed for use in a fluid dispenser.

Referring now to FIG. 5, it can be seen that a fluid dispenser 10D has a tapered pressure vessel 130. The advantage of this alternative embodiment is apparent in that a decreased volume of fluid is concentrated around the end of the bubbler tube 52. As such, the use of a tapered pressure vessel 130 increases the accuracy on smaller quantities of the fluid to be dispensed. As those skilled in the art will appreciate, a tapered pressure vessel 130 increases the resolution at the bottom of the vessel because pressure in the bubbler tube 52 is proportional to the fluid level, Thus, it can be seen that the objects of the invention have been satisfied by the structure presented above. It should be apparent to those skilled in the art that the objects of the invention could be practiced with any type of fluid or liquid or be adapted to perform with any size or shape pressure vessel. In fact, the present invention could also be employed in the supply tanks 14 which range in size from a few hundred to a few thousand gallons.

While the preferred embodiment of the invention has been presented and described in detail, it will be understood that the invention is not limited thereto or thereby. Indeed, various types of valves and inflow and outflow configurations may be used in the construction of the invention to meet the various needs of the end user. Accordingly, for an appreciation of the true scope and breadth of the invention, reference should be made to the following claims.

What is claimed is:

1. A fluid dispenser for measuring precise volumes of a fluid, comprising:

a pressure vessel for receiving a fluid supplied from a supply tank; a sense pressure supply a bubbler tube received within said pressure vessel and connected to said sense pressure supply, said sense pressure supply continually exerting a pressure through said bubbler tube while said pressure vessel is receiving said fluid from said supply tank;

a controller in communication with said bubbler tube for controlling the inflow and outflow of said fluid through said pressure vessel; and a pressure transducer connected to said controller and in communication with said bubbler tube, said pressure transducer monitoring a pressure within said bubbler tube, said controller correlating said pressure to a volume of said fluid in said pressure vessel and stopping said inflow of said fluid when said pressure reaches a predetermined level.

2. The fluid dispenser according to claim 1, further comprising:

a first solenoid valve operative with said controller for providing said sense pressure supply to said bubbler tube;

a second solenoid valve operative with said controller and disposed between said supply tank, said pressure vessel and a dispense tank such that said second solenoid valve opens and closes under control of said controller for regulating the inflow and outflow of said fluid through said pressure vessel; and a third solenoid valve operative with said controller and disposed between a dispense pressure supply and said pressure vessel such that said third solenoid valve opens and closes under control of said controller for forcing said fluid out of said pressure vessel and into said dispense tank.

3. The fluid dispenser according to claim 2, further comprising a dispense pressure tube disposed between said third solenoid valve and said pressure vessel, wherein said dispense pressure tube receives said bubbler tube.

4. The fluid dispenser according to claim 2, wherein said pressure vessel has a top end and a bottom end, said pressure vessel tapered from said top end inwardly to said bottom end to provide increased resolution of said bubbler sensor in correlating the amount of pressure in said bubbler tube and thus the volume of fluid within said pressure vessel.

5. The fluid dispenser according to claim 2, further comprising:

an insulator disposed between said bubbler tube and said pressure vessel; and an empty sense line interconnected between said pressure vessel and said controller such that a closed circuit is observed between said bubbler tube and said pressure vessel whenever said fluid is in contact with said bubbler tube so as to allow said controller to detect whenever the desired amount of fluid has flowed out of said pressure vessel.

6. The fluid dispenser according to claim 5, further comprising:

a sight tube operative with said pressure vessel so as to provide a visual indication of said fluid therein.

7. The fluid dispenser according to claim 6, wherein said bubbler tube is received by said insulator and wherein said sight tube receives said insulator so as to provide a visual indication of the operation of said bubbler tube.

8. A fluid dispenser for measuring precise volumes of a fluid for later mixing with other materials, comprising:

a pressure vessel;

a supply tank for supplying a fluid to said pressure vessel;

a bubbler tube received in said pressure vessel;

an insulator disposed between said bubbler tube and said pressure vessel;

a dispense pressure supply in communication with said pressure vessel;

a dispense tank for receiving said fluid from said pressure vessel;

a controller in communication with said bubbler tube for determining a precise volume of said fluid received and dispensed by said pressure vessel; and an empty sense line interconnected between said pressure vessel and said controller such that a closed circuit is observed between said bubbler tube and said pressure vessel whenever said fluid is in contact with said bubbler tube and an open circuit is observed whenever said fluid is not in such contact.

9. The fluid dispenser according to claim 8, further comprising:

a sense pressure supply communicative with said bubbler tube;

a first solenoid valve operatively controlled by said controller and disposed between said sense pressure supply and said bubbler tube; and a pressure transducer interconnected between said controller and said bubbler tube for determining the amount of pressure within said bubbler tube and thus the volume of fluid within said pressure vessel.

10. The fluid dispenser according to claim 9, further comprising:

a second solenoid valve operatively controlled by said controller and disposed between said supply tank, said dispense tank and said pressure vessel; and a third solenoid valve operatively controlled by said controller and disposed between said dispense pressure supply and said pressure vessel, wherein said controller opens and closes said plurality of solenoid valves to receive and precisely measure an amount of fluid in said pressure vessel, and to transfer said fluid to said dispense tank.

11. The fluid dispenser according to claim 10, further comprising:

a sight tube operatively connected to said pressure vessel so as to provide a visual indication of the amount of said fluid in said pressure vessel.

12. The fluid dispenser according to claim 11, wherein said bubbler tube and said insulator is received within said sight tube so as to provide a visual indication of the operation of said bubbler tube.

13. The fluid dispenser according to claim 10, further comprising:

a dispense pressure tube disposed between said third solenoid valve and said pressure vessel, wherein said dispense pressure tube receives said bubbler tube such that said dispense pressure supply clears said bubbler tube.

14. The fluid dispenser according to claim 10, wherein said pressure vessel has a top end and a bottom end, said pressure vessel tapered from said top end inwardly to said bottom end to provide increased resolution by said bubbler tube in correlating an amount of pressure therein with a volume of fluid within pressure vessel.

* * * * *